US011082363B2

(12) United States Patent
Toshima

(10) Patent No.: US 11,082,363 B2
(45) Date of Patent: Aug. 3, 2021

(54) COMMUNICATION APPARATUS PERFORMING MULTI-CAMERA LIVE STREAMING, CONTROL METHOD THEREFOR, AND STORAGE MEDIUM

(71) Applicant: CANON KABUSHIKI KAISHA, Tokyo (JP)

(72) Inventor: Naoto Toshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/561,692

(22) Filed: Sep. 5, 2019

(65) Prior Publication Data
US 2020/0106716 A1    Apr. 2, 2020

(30) Foreign Application Priority Data

Sep. 28, 2018   (JP) .............................. JP2018-184796

(51) Int. Cl.
*H04N 5/232* (2006.01)
*H04L 12/911* (2013.01)
(Continued)

(52) U.S. Cl.
CPC ............ *H04L 47/822* (2013.01); *H04L 45/42* (2013.01); *H04N 5/23206* (2013.01);
(Continued)

(58) Field of Classification Search
CPC .. H04N 7/181; H04N 21/238; H04N 21/2387; H04N 5/23206; H04N 5/232061; H04L 65/60; H04L 65/608
See application file for complete search history.

(56) References Cited

U.S. PATENT DOCUMENTS 10,491,967 B1 * 11/2019 Sismondo ........ H04N 21/25808
2006/0204229 A1 * 9/2006 Onodera ................ H04N 7/181
386/223
(Continued)

FOREIGN PATENT DOCUMENTS

| JP | 2006-4279 A    | 1/2006  |
|----|----------------|---------|
| JP | 2007-325109 A  | 12/2007 |
| JP | 2018-093401 A  | 6/2018  |

*Primary Examiner* — Jeong S Park
(74) *Attorney, Agent, or Firm* — Canon U.S.A., Inc. IP Division

(57) ABSTRACT

A communication apparatus that is located within a local area network (LAN) includes a communication unit configured to communicate with an external apparatus located outside the LAN and with another communication apparatus located within the LAN, and a control unit. The control unit receives information about live streaming performed using a plurality of communication apparatuses. The control unit detects the other communication apparatus configured to perform the live streaming, the other communication apparatus being located within the LAN. In a case where the other communication apparatus configured to perform the live streaming is not detected within the LAN, the control unit sets a bit-rate of moving image data to a first bit-rate. In a case where the other communication apparatus configured to perform the live streaming is detected within the LAN, the control unit sets the bit-rate to a second bit-rate, the second bit-rate being lower than the first bit-rate.

17 Claims, 7 Drawing Sheets

(51) Int. Cl.
*H04N 7/18* (2006.01)
*H04L 12/717* (2013.01)
*H04L 29/06* (2006.01)

(52) U.S. Cl.
CPC ....... *H04N 5/232061* (2018.08); *H04N 7/181* (2013.01); *H04L 65/608* (2013.01)

(56) References Cited

U.S. PATENT DOCUMENTS

| | | | | |
|---|---|---|---|---|
| 2007/0217765 | A1* | 9/2007 | Itoh | H04N 5/76 |
| | | | | 386/202 |
| 2011/0050925 | A1* | 3/2011 | Watanabe | H04N 5/23203 |
| | | | | 348/211.2 |
| 2017/0019581 | A1* | 1/2017 | Calvarese | G01S 3/00 |
| 2017/0171567 | A1* | 6/2017 | Wu | H04N 21/4524 |
| 2017/0187768 | A1* | 6/2017 | Huang | H04L 67/2842 |
| 2019/0394504 | A1* | 12/2019 | Von Braun | H04N 5/225 |

* cited by examiner

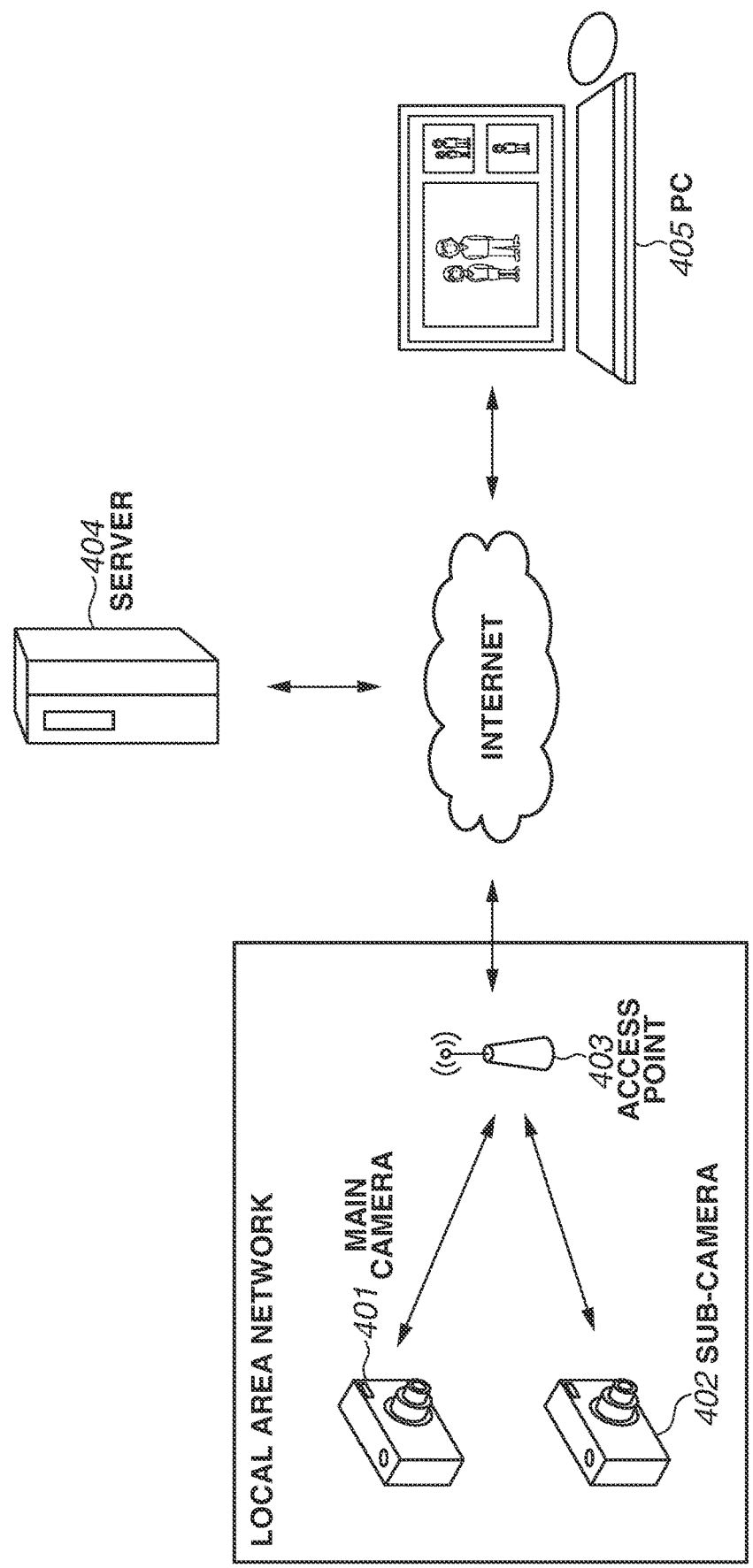

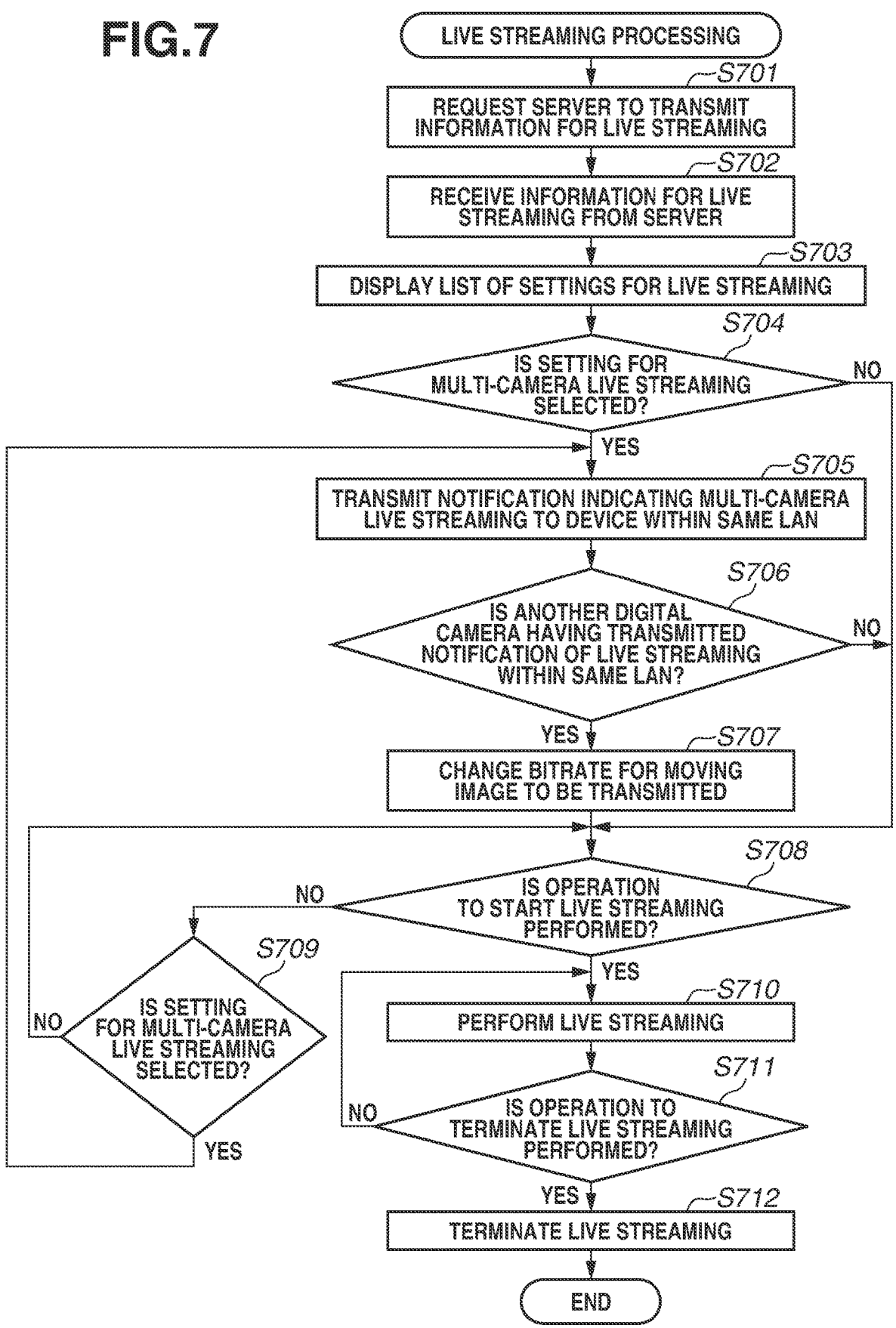

US 11,082,363 B2

COMMUNICATION APPARATUS PERFORMING MULTI-CAMERA LIVE STREAMING, CONTROL METHOD THEREFOR, AND STORAGE MEDIUM

BACKGROUND

Field of the Disclosure

The present disclosure relates to a communication apparatus capable of performing wireless communication, a control method for the communication apparatus, and a storage medium.

Description of the Related Art

In these days, there is an apparatus with which a user can distribute moving images captured by a camera in real time, like live broadcasting on television, through a social networking service (SNS) or the like on the Internet (e.g., live streaming). In the apparatus, the user can further perform live streaming of a plurality of moving images captured by a plurality of cameras and arrange the captured moving images on one screen. The user that performs live streaming by arranging a plurality of moving images on the screen can also perform the live streaming by connecting a plurality of cameras to one local area network (LAN) built at home or other places. In this case, since the plurality of cameras simultaneously uses the bandwidth of the LAN, congestion occurs and thus a delay in live streaming of moving images is more likely to occur. As a technique for avoiding such congestion, Japanese Patent Application Laid-Open No. 2006-4279 discusses an apparatus that rearranges the order of data to be transmitted depending on the length of each of a plurality of pieces of data when the plurality of pieces of data are simultaneously transmitted to a communication network.

However, in the live streaming, if the cameras do not transmit moving image data in chronological order, a delay in live streaming of moving images is more likely to occur. Accordingly, in the technique discussed in Japanese Patent Application Laid-Open No. 2006-4279 in which the order of data to be transmitted is rearranged, it is difficult to reduce the delay in live streaming of moving images, even though congestion in data communication is resolved.

SUMMARY

According to an aspect of some embodiments, a communication apparatus that is located within a local area network includes a communication unit configured to communicate with an external apparatus located outside the local area network and with another communication apparatus located within the local area network, and a control unit. The control unit receives information about live streaming performed using a plurality of communication apparatuses from the external apparatus via the communication unit. The control unit detects the other communication apparatus configured to perform the live streaming via the communication unit based on the information, the other communication apparatus being located within the local area network. In a case where the other communication apparatus configured to perform the live streaming is not detected within the local area network, the control unit sets a bit-rate of moving image data used for the live streaming to a first bit-rate. In a case where the other communication apparatus configured to perform the live streaming is detected within the local area network, the control unit sets the bit-rate of moving image data used for the live streaming to a second bit-rate, the second bit-rate being lower than the first bit-rate. In a case where the live streaming is started, the control unit controls the communication unit to transmit the moving image data at the set bit-rate to the external apparatus.

Further features of various embodiments will become apparent from the following description of exemplary embodiments with reference to the attached drawings.

BRIEF DESCRIPTION OF THE DRAWINGS

FIG. 4 is a configuration diagram illustrating a system for multi-camera live streaming according to the first exemplary embodiment.

FIG. 7 is a flowchart illustrating an operation of the digital camera according to the first exemplary embodiment.

DESCRIPTION OF THE EMBODIMENTS

Exemplary embodiments will be described in detail below with reference to the accompanying drawings.

The exemplary embodiments described below are merely examples. The exemplary embodiments may be modified or changed as needed depending on the configuration of an apparatus to which the aspects are applied and various conditions. The exemplary embodiments can be combined as needed.

The term "congestion" used herein refers to a state in which the total number of packets to be transmitted and received within a local area network (LAN) is large and the bandwidth of the LAN is used to such an extent that a delay may occur in data communication within the LAN.

<Configuration of Digital Camera>

Figure 1:
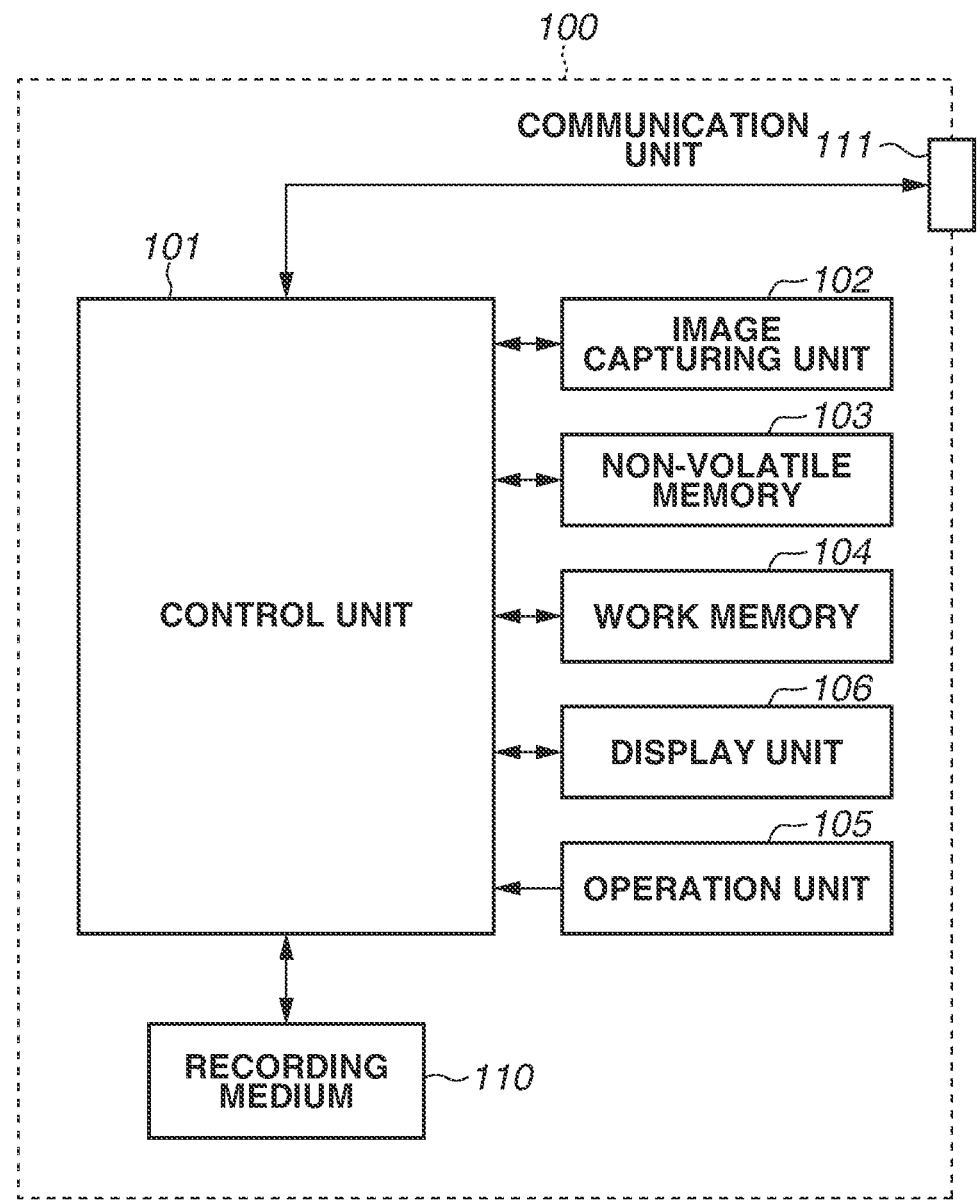
FIG. 1 is a block diagram illustrating a configuration example of a digital camera according to a first exemplary embodiment.

In the following description, a first exemplary embodiment will be described. FIG. 1 is a block diagram illustrating a configuration example of a digital camera 100, which is an example of a communication apparatus according to the first exemplary embodiment. While the digital camera 100 is described as an example of the communication apparatus according to the first exemplary embodiment, the communication apparatus is not limited to this example. The communication apparatus may be, for example, an information processing apparatus, such as a personal computer (PC), a cellular phone, a smartphone, a tablet device, or a digital video camera.

A control unit 101 controls each unit included in the digital camera 100 based on an input signal and a program described below. Instead of the control unit 101 controlling the entire communication apparatus, a plurality of hardware components can share processing to control the entire communication apparatus.

An image capturing unit 102 includes an optical system for controlling an optical lens unit, a diaphragm, zooming, and focusing, and includes an image sensor for converting light introduced through the optical lens unit (an optical image) into an electrical image signal. A complementary metal oxide semiconductor (CMOS) sensor or a charge coupled device (CCD) sensor is generally used as the image sensor. Under the control of the control unit 101, the image capturing unit 102 converts subject light focused by the optical lens unit into an electrical signal by using the image sensor, performs noise reduction processing or other processing on the electrical signal, and outputs image data or moving image data (digital data). In the present exemplary embodiment, a series of processes for capturing and outputting the image data or moving image data is referred to as "image capturing". The digital camera 100 according to the present exemplary embodiment records the image data on a recording medium 110 in conformity with the Design Rule for Camera File System (DCF) standard.

A non-volatile memory 103 is an electrically erasable and recordable non-volatile memory that stores, for example, programs to be executed by the control unit 101 as described below.

A work memory 104 is used as, for example, a buffer memory for temporarily storing image data or moving image data captured by the image capturing unit 102, an image display memory for a display unit 106, or a work area for the control unit 101.

An operation unit 105 is used to receive an instruction to the digital camera 100 from the user. The operation unit 105 includes a power button used for the user to instruct the digital camera 100 to be powered ON or OFF, a release switch for instructing image capturing, and a playback button for instructing reproduction of image data. The operation unit 105 further includes an operation member, such as a dedicated connection button, to start communication with an external apparatus via a communication unit 111, which is described below. A touch panel that is formed on the display unit 106, which is described below, is also included in the operation unit 105. The release switch includes SW1 and SW2 (not illustrated). When the release switch is in a so-called half-pressed state, the SW1 is turned on. With this operation, the operation unit 105 receives an instruction for performing preparation processing, such as autofocus (AF) processing, automatic exposure (AE) processing, automatic white balance (AWB) processing, or flash preliminary emission (so-called EF) processing. When the release switch is in a so-called fully-pressed state, the SW2 is turned on. With this operation, the operation unit 105 receives an instruction for image capturing.

The display unit 106 displays, for example, a view finder image for image capturing, a captured image data, and texts for interactive operations. The display unit 106 does not necessarily need to be integrated with the digital camera 100. The digital camera 100 can be connected to the display unit 106 either inside or outside the digital camera 100. Thus, the digital camera 100 only needs to be provided with at least a display control function for controlling the display unit 106.

The recording medium 110 can record the image data or moving image data output from the image capturing unit 102. The recording medium 110 may be configured to be attachable to and detachable from the digital camera 100, or may be integrated with the digital camera 100. In other words, the digital camera 100 may need only to include at least a unit for accessing the recording medium 110.

The communication unit 111 is an interface for connecting with an external apparatus. The digital camera 100 according to the present exemplary embodiment can exchange data with the external apparatus via the communication unit 111. For example, moving image data generated by the image capturing unit 102 can be transmitted to the external apparatus via the communication unit 111. In the present exemplary embodiment, the communication unit 111 includes an interface for communicating with the external apparatus via a so-called wireless LAN that is in conformity with the Institute of Electrical and Electronics Engineers (IEEE) 802.11 standard. The control unit 101 achieves wireless communication with an external apparatus by controlling the communication unit 111. The communication method is not limited to the wireless communication method, and may include wired communication methods.

Figure 2A:
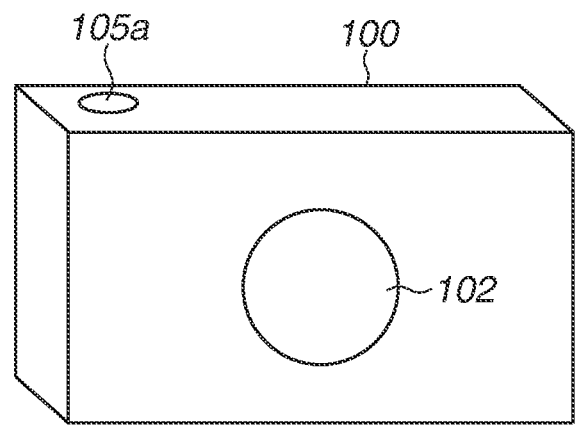
FIG. 2A is an external view illustrating a front side of the digital camera according to the first exemplary embodiment.
Figure 2B:
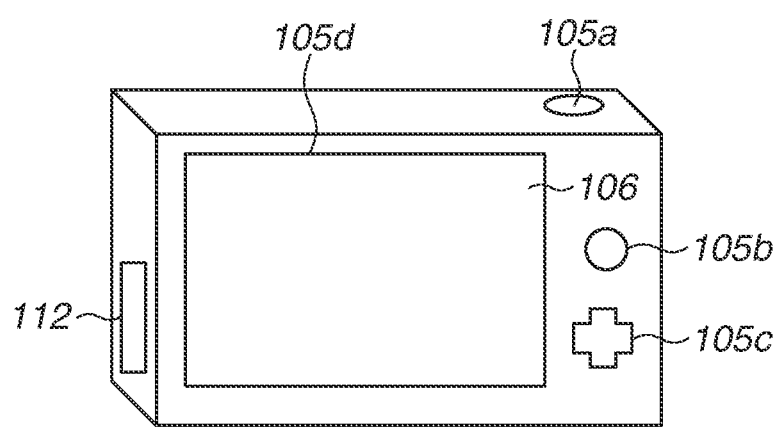
FIG. 2B is an external view illustrating a back side of the digital camera according to the first exemplary embodiment.

Next, the appearance of the digital camera 100 will be described. FIGS. 2A and 2B each illustrate an example of an appearance of the front side and the back side of the digital camera 100, respectively. A release switch 105a, a playback button 105b, arrow keys 105c, and a touch panel 105d are operation members included in the operation unit 105 described above. An image obtained by the image capturing unit 102 is displayed on the display unit 106.

These are the descriptions about the digital camera 100.

<System Configuration of Multi-Camera Live Streaming>

The term "live streaming" refers to a technique for a user distributing moving images in real time on the Internet by a streaming technique, like a technique used in live broadcasting on television. Further, the user can perform live streaming of a plurality of moving images on one web page, and a viewer that views the moving images can view the live streaming by switching the plurality of moving images. Live streaming of moving images using a plurality of cameras is hereinafter referred to as multi-camera live streaming. In the present exemplary embodiment, the digital camera 100 is an example of the communication apparatus that conforms to the multi-camera live streaming. The multi-camera live streaming is a technique of live streaming in which a plurality of digital cameras 100 transmits captured moving image data to an external server, and the external server distributes the moving image data in such a manner that the moving image data can be viewed on one web page.

Before starting the live streaming, the user creates an event in the server by using a PC, a smartphone, or the like. The event is data including settings about live streaming, such as a live streaming identifier, a live streaming title, a bit-rate of a video image, and the number of digital cameras 100 to be used for the live streaming. The user can create a plurality of events in the server. The digital cameras 100 acquire the events from the server and perform live streaming processing based on the events. Further, in the present exemplary embodiment, the event of multi-camera live streaming is created for each digital camera 100. For example, in a case where multi-camera live streaming is set using three digital cameras 100, three events are created. However, in the present exemplary embodiment, the three events have a common live streaming identifier. Each of the three digital cameras 100 receives a corresponding one of the three events from the server, thereby enabling the user to perform multi-camera live streaming using the three digital cameras 100.

Figure 3A:
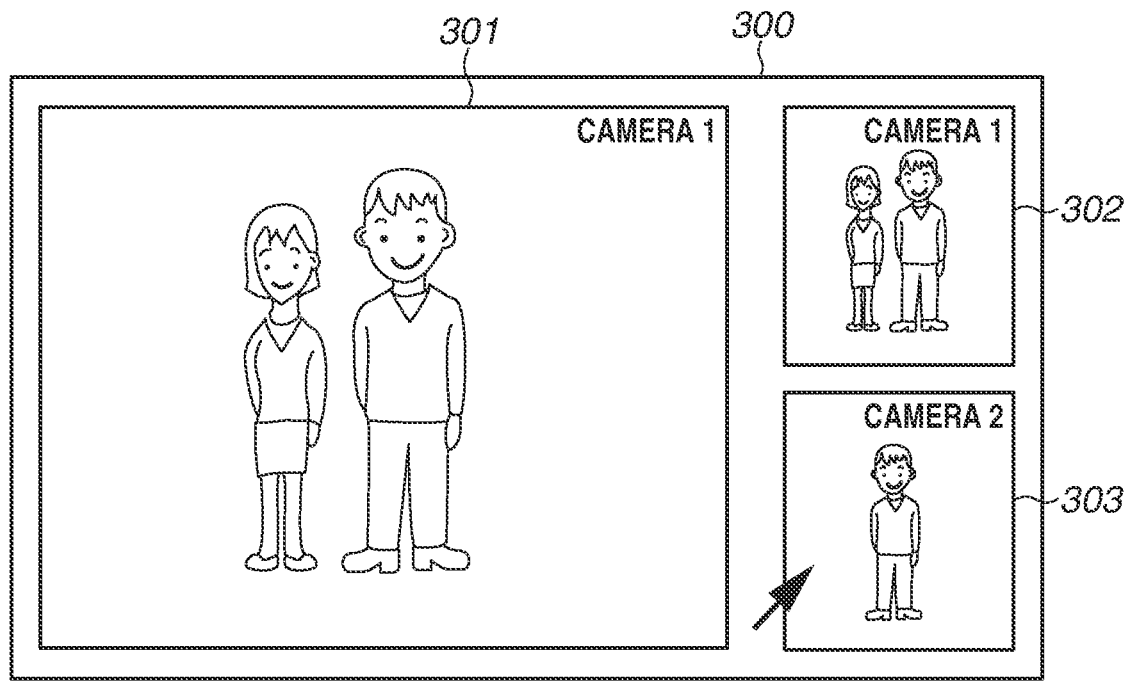
FIG. 3A illustrates an example of a screen on which a moving image captured by a camera is reproduced on a web page that is being delivered during multi-camera live streaming according to the first exemplary embodiment.
Figure 3B:
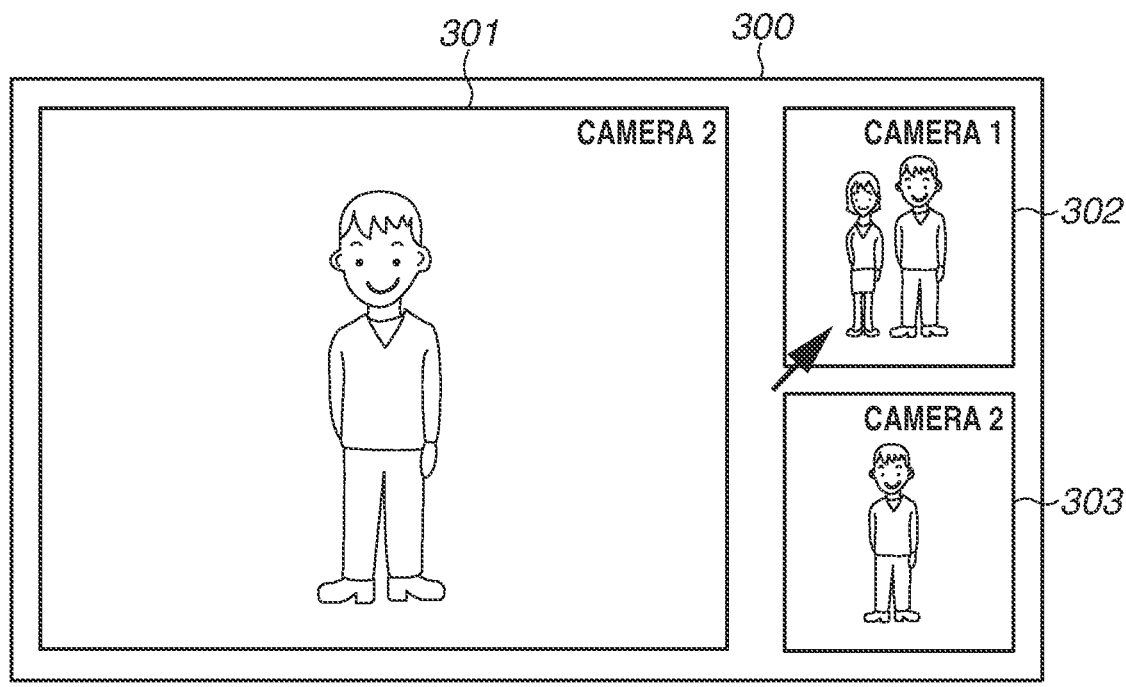
FIG. 3B illustrates an example of a screen on which a moving image captured by a camera is reproduced on a web page that is being delivered during multi-camera live streaming according to the first exemplary embodiment.

FIGS. 3A and 3B each illustrate an example of a web page on which multi-camera live streaming is performed using two digital cameras 100. The two digital cameras 100 are hereinafter referred to as a camera 1 and a camera 2, respectively. Assume herein that the screen illustrated in FIG. 3A is a screen that is first displayed when the web page on which the user performs multi-camera live streaming is opened. On the screen used to view the multi-camera live streaming on the web page, the screen that is mainly viewed by the user is referred to as a main screen, and screens other than the main screen are referred to as sub-screens. On a main screen 301, a moving image captured by the camera 1 is reproduced. On a sub-screen 302 and a sub-screen 303, moving images captured by the camera 1 and the camera 2, respectively, are reproduced. Sizes of the sub-screen 302 and 303 are smaller than that of the main screen 301. In a state illustrated in FIG. 3A, the user views mainly the moving image displayed on the main screen 301. In this case, when the user clicks the sub-screen 303, the moving image reproduced on the sub-screen 303 on the web page is reproduced on the main screen 301, as illustrated in FIG. 3B. Further, when the user clicks the sub-screen 302 in the state illustrated in FIG. 3B, the screen returns to the state illustrated in FIG. 3A, and then the moving image reproduced on the sub-screen 302 on the web page is reproduced on the main screen 301. Thus, in the multi-camera live streaming, the viewer can view the moving images by freely switching the moving images captured by the plurality of digital cameras 100. The following description is made assuming that the camera 1 is referred to as a main camera 401 and the camera 2 is referred to as a sub-camera 402. In the multi-camera live streaming according to the present exemplary embodiment, the moving image captured by the main camera 401 is displayed on the main screen 301 even when the user uses three or more digital cameras 100 to perform multi-camera live streaming.

FIG. 4 is a configuration diagram illustrating a system for multi-camera live streaming. The main camera 401 and the sub-camera 402 each have the same configuration as the digital camera 100. An access point 403 and a server 404 are connected to each other via the Internet, and the server 404 and a PC 405 are also connected to each other via the Internet.

The main camera 401 and the sub-camera 402 are wirelessly connected to a LAN formed by the access point 403 and transmit captured moving image data to the server 404 via the access point 403. Assume herein that the server 404 and the PC 405 are not included in the range of the LAN formed by the access point 403. Further, in the present exemplary embodiment, the moving image data transmitted from the main camera 401 is first reproduced when the web page on which the user performs live streaming is opened. The moving image data transmitted from the sub-camera 402 is reproduced in such a manner that the user operates the web page and switches the moving images to be reproduced. For example, in FIG. 3A, the moving image captured by the camera 1 corresponds to the moving image captured by the main camera 401, and the moving image captured by the camera 2 corresponds to the moving image captured by the sub-camera 402.

The server 404 receives the moving image data from each of the main camera 401 and the sub-camera 402 via the Internet. Upon receiving a request for multi-camera live streaming from the PC 405, the server 404 transmits the moving image data to the PC 405.

These are the descriptions about the configuration diagram illustrating the system for multi-camera live streaming.

<Procedure of Multi-Camera Live Streaming>

Next, a procedure to perform multi-camera live streaming according to the first exemplary embodiment will be described.

Figure 5A:
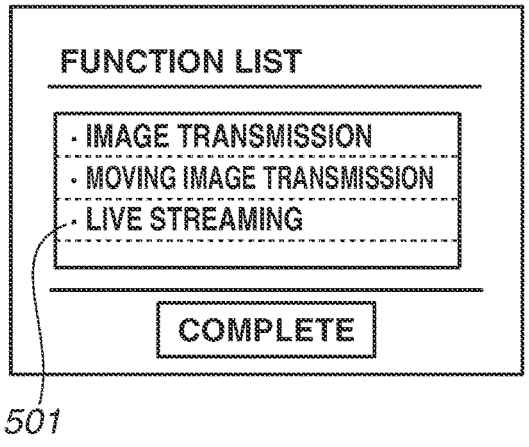
FIG. 5A illustrates an example of a screen for selecting a function of the digital camera according to the first exemplary embodiment.
Figure 5B:
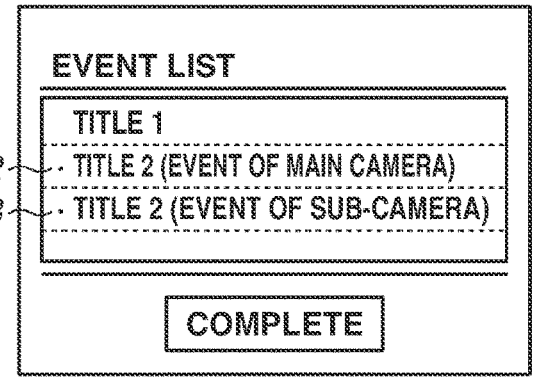
FIG. 5B illustrates an example of a screen for selecting an event of the digital camera according to the first exemplary embodiment.
Figure 5C:
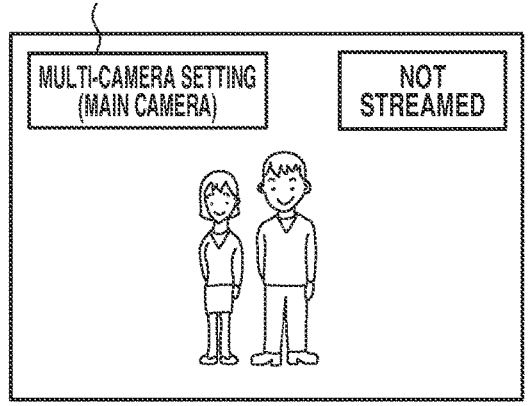
FIG. 5C illustrates an example of a standby screen before live streaming of the digital camera according to the first exemplary embodiment is performed.
Figure 5D:
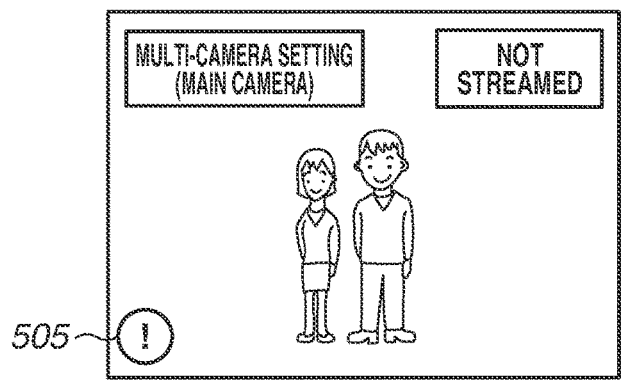
FIG. 5D illustrates an example of a case where a warning sign is displayed on the standby screen of the digital camera according to the first exemplary embodiment.
Figure 5E:
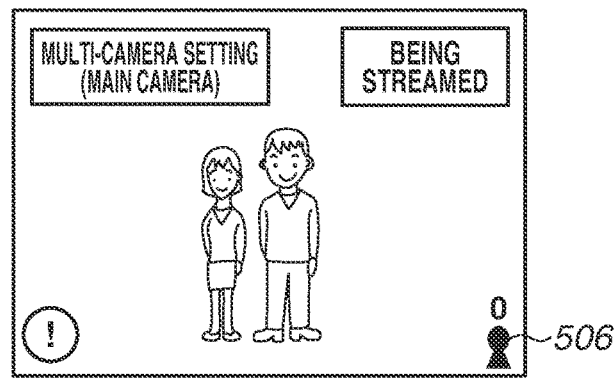
FIG. 5E illustrates an example of a screen used during live streaming of the digital camera according to the first exemplary embodiment.
Figure 6:
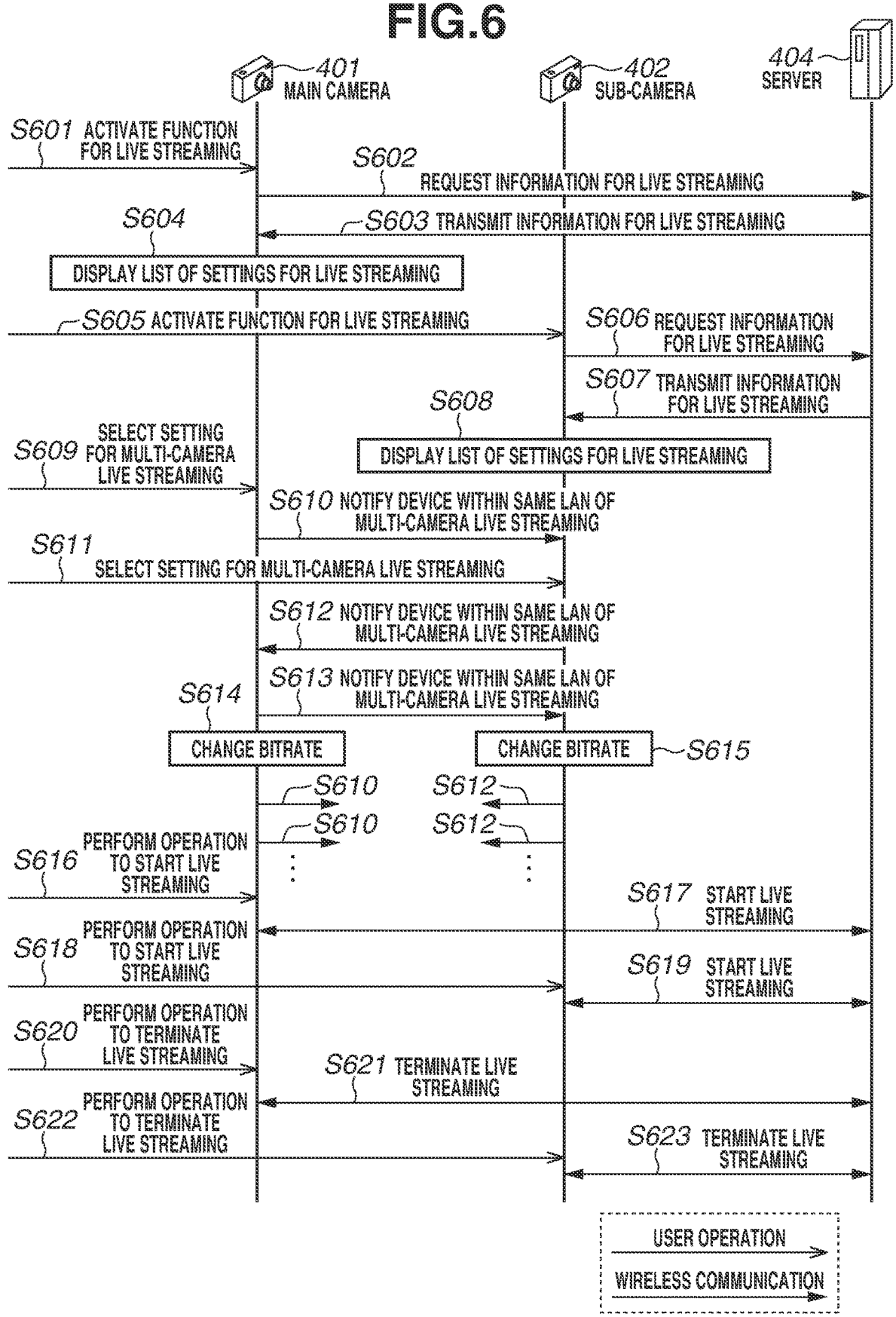
FIG. 6 is a sequence diagram illustrating processing to be performed when multi-camera live streaming according to the first exemplary embodiment is implemented.

FIGS. 5A to 5E each illustrate an example of a screen to be displayed on the display unit 106 of each of the main camera 401 and the sub-camera 402 when multi-camera live streaming is performed. FIG. 6 is a sequence diagram illustrating processing to be performed by the main camera 401, the sub-camera 402, and the server 404 when multi-camera live streaming is performed. The sequence diagram illustrated in FIG. 6 will be described with reference to FIG. 5.

In S601, the user operates the operation unit 105 to activate the function for live streaming of the main camera 401. In FIG. 5A, the user selects, for example, a live streaming 501 (e.g., "live distribution") on the screen of the main camera 401.

In S602, the main camera 401 requests the server 404 to transmit information for live distribution, for example a live streaming event.

In S603, the server 404 transmits information for live distribution (e.g., the event) to the main camera 401. In this case, if there is a plurality of events, the server 404 transmits all the events to the main camera 401.

In S604, the main camera 401 displays a list of settings for live distribution, for example a list of events, received in S603. The main camera 401 displays, for example, a list of titles included in the events, as illustrated in FIG. 5B. The user selects an event 502 on the screen illustrated in FIG. 5B. The event 502 is an event of transmitting a moving image by using the digital camera 100 as the main camera 401 (e.g., camera 1 illustrated in FIG. 3) in multi-camera live streaming. The main camera 401 performs live streaming processing in accordance with the event 502. Assume herein that the bit-rate of the moving image data included in the event 502 is set to 10 Mbps.

The processing of S605, S606, and S607 is performed by the sub-camera 402, like in the processing of S601, S602, and S603 performed by the main camera 401.

In S608, the sub-camera 402 displays a list of settings for live distribution, for example a list of events, received in S603. For example, the sub-camera 402 displays a list of titles included in the events as illustrated in FIG. 5B. The user selects an event 503 on the screen illustrated in FIG. 5B. The event 503 is an event of transmitting a moving image by using the digital camera 100 as the sub-camera 402 (e.g., camera 2 illustrated in FIG. 3) in multi-camera live streaming. The sub-camera 402 performs live streaming processing in accordance with the event 503. The event 503 is a live streaming event using the digital camera 100 as the sub-camera 402 in the same live streaming as the multi-camera live streaming performed in accordance with the event 502. Assume herein that the bit-rate of the moving image data included in the event 503 is set to 8 Mbps.

In S609, the user operates the operation unit 105 of the main camera 401 to select an event. When the user selects the event 502, the main camera 401 displays a standby screen, as illustrated in FIG. 5C, before live streaming. A dialog box 504 illustrated in FIG. 5C displays the current setting for live streaming.

In S610, the main camera 401 transmits a notification to a device connected within the LAN to indicate that multi-camera live streaming is to be performed. The main camera 401 transmits, for example, the live streaming identifier included in the event 502. In this case, the main camera 401 repeatedly transmits this notification until the live streaming is started by the user. Since the multi-camera live streaming is not set to the sub-camera 402 yet, the sub-camera 402 ignores the notification from the main camera 401.

In S611, the user operates the operation unit 105 of the sub-camera 402 to select a setting for multi-camera live distribution, for example by selecting an event. When the user selects the event 503, the sub-camera 402 displays a standby screen before live streaming using a user interface (UI) similar to that illustrated in FIG. 5C.

In S612, the sub-camera 402 transmits a notification to the device connected within the LAN of the multi-camera live streaming. The sub-camera 402 transmits, for example, the live streaming identifier included in the event 503. Assume herein that the live streaming identifier included in the event 502 is identical to the live streaming identifier included in the event 503. The main camera 401 receives the notification and detects that another digital camera 100, which performs the same multi-camera live streaming, is within the same LAN. The main camera 401 compares, for example, the live streaming identifier of the event selected in S609 with the received live streaming identifier and determines whether the live streaming identifiers match. If the two identifiers match, the main camera 401 determines that the sub-camera 402 performs the same live streaming. In this case, the main camera 401 displays a warning sign 505 on the screen, as illustrated in FIG. 5D, indicating that the bit-rate is decreased. This display enables the user to recognize that the bit-rate of the moving image used for live streaming has been automatically changed. In this case, the sub-camera 402 repeatedly transmits the notification until the live streaming is started by the user.

In S613, the main camera 401, like in S610, transmits a notification to the device connected within the LAN to indicate that multi-camera live streaming is performed. The notification transmitted in S613 is not a response to the notification from the sub-camera 402 received in S612, but is transmitted as a notification to be repeatedly transmitted from S610. Since the multi-camera live streaming is set in S611, the sub-camera 402 receives the notification and detects that another digital camera 100, which performs the same multi-camera live streaming, is within the same LAN. The sub-camera 402 compares, for example, the live streaming identifier of the set event with the received live streaming identifier and determines whether the live streaming identifiers match. If the two identifiers match, the sub-camera 402 determines that the main camera 401 performs the same live streaming. The sub-camera 402 further displays a warning sign 505 using a UI similar to that illustrated in FIG. 5D.

Even after the processing of S612 and S613, the main camera 401 and the sub-camera 402 repeatedly perform the processing of S610 and S612, respectively, and continuously transmit the notification until the live streaming is started. During a period in which the main camera 401 and the sub-camera 402 receive the notification, the main camera 401 and the sub-camera 402 can recognize that another camera that performs the same multi-camera live streaming is within the LAN. On the contrary, if the main camera 401 and the sub-camera 402 cannot receive the notification, the main camera 401 and the sub-camera 402 recognize that no cameras that perform the same multi-camera live streaming are within the LAN.

Since the main camera 401 has received the notification to transmit the moving image in the same live streaming from the sub-camera 402 in S612, in S614, the main camera 401 changes the bit-rate of the moving image data to be transmitted to the server 404. The main camera 401 decreases the bit-rate of the moving image data to be transmitted, for example, from 10 Mbps to 5 Mbps.

Since the sub-camera 402 has received the notification to transmit the moving image in the same live streaming from the main camera 401 in S613, in S615, the sub-camera 402 changes the bit-rate of the moving image data to be transmitted to the server 404. The sub-camera 402 decreases the bit-rate of the moving image data to be transmitted, for example, from 8 Mbps to 4 Mbps.

As described above, the main camera 401 and the sub-camera 402 divide the bit-rate by the total number of cameras used for the same live streaming. In this case, the total amount of moving image data to be transmitted from all cameras is less than or equal to the amount of moving image data to be transmitted from one camera with a highest bit-rate without decreasing the bit-rate. Consequently, the digital camera 100 can prevent congestion in data communication and can reduce a delay in live streaming.

In S616, the user uses the operation unit 105 to operate the main camera 401 to start the live streaming. In S616, the main camera 401 displays a screen indicating that the live streaming is being performed using the main camera 401 as illustrated in FIG. 5E. In this case, an icon 506 indicates the number of viewers that are viewing the moving images transmitted from the main camera 401 in the live streaming. The main camera 401 receives the information (i.e., the number of viewers) from the server 404 during the live streaming in S617 described below.

In S617, the main camera 401 transmits, to the server 404, a request packet to start live streaming, and the main camera 401 starts the live streaming. The main camera 401 sequentially (in real time) transmits the captured moving image data to the server 404 with the start of live streaming as a trigger. During the live streaming, the main camera 401 receives, from the server 404, information about the number of viewers that are viewing the moving images transmitted from the main camera 401 and reflects the information in the icon 506. If the number of viewers that are viewing the moving images transmitted from the main camera 401 in the live streaming is, for example, five, the number "5" is displayed on the icon 506.

The processing of S618 and S619 is performed by the sub-camera 402 similar to the processing of S614 and S615 performed by the main camera 401.

In S620, the user uses the operation unit 105 to operate the main camera 401 to perform an operation for terminating the live streaming.

In S621, the main camera 401 transmits a request for terminating the live streaming to the server 404, and terminates the live streaming.

The processing of S622 and S623 is performed by the sub-camera 402 similar to the processing of S620 and S621 performed by the main camera 401.

These are the descriptions about the procedure for performing the multi-camera live streaming.

In the present exemplary embodiment, it is assumed that the server that transmits a request to start the live streaming is identical to the server that transmits moving images used for live streaming. However, separate servers may be used.

In S614 and S615, the main camera 401 and the sub-camera 402 may further be set to have the same bit-rate. Examples of a method for changing the setting for the bit-rate of each of the main camera 401 and the sub-camera 402 include a method of changing the higher one of the bit-rate of the main camera 401 and the bit-rate of the sub-camera 402 to the lower one of the bit-rate of the main camera 401 and the bit-rate of the sub-camera 402, and a method of setting the bit-rate of each of the main camera 401 and the sub-camera 402 to any one of the bit-rates. In S612 and S613, it is also possible to employ a method of gradually decreasing the bit-rate of each of the main camera 401 and the sub-camera 402 by a predetermined rate or by a predetermined bit-rate value, without distinguishing the main camera 401 from the sub-camera 402. For example, in some embodiments the main camera 401 decreases the bit-rate by 10% or by 1 Mbps every time one camera to be used in multi-camera live streaming is added. In this case, the total amount of moving image data to be transmitted increases as the number of the digital cameras 100 that performs the multi-camera live streaming increases. However, the user can perform the live streaming while minimizing a decrease in the bit-rate of moving image data and maintaining a certain level of image quality of moving images.

Further, in S612 and S613, the bit-rate of moving images may be changed in such a manner that the bit-rate of moving images to be captured by the main camera 401 is higher than the bit-rate of moving images to be captured by the sub-camera 402. This method is effective when the user that performs the live streaming gives a higher priority to the image quality of moving images captured by the main camera 401 than the image quality of moving images captured by the sub-camera 402. In S612 and S613, the main camera 401 transmits the bit-rate thereof to the sub-camera 402 and receives the bit-rate of the sub-camera 402 therefrom, and the sub-camera 402 transmits the bit-rate thereof to the main camera 401 and receives the bit-rate of the main camera 401 therefrom. The main camera 401 and the sub-camera 402 then compare the bit-rates of the main camera 401 and the sub-camera 402 with the bit-rates of the sub-camera 402 and the main camera 401, respectively, and thus the bit-rates are changed in such a manner that the bit-rate of the main camera 401 becomes higher than the bit-rate of the sub-camera 402.

In S616, the main camera 401 displays the number of viewers that are viewing the live streaming. However, the main camera 401 may display other data on live streaming instead of the number of viewers. For example, the main camera 401 displays the number of users that have bookmarked the live streaming, the number of comments, and the number of high ratings or low ratings. The sub-camera 402 can also perform processing similar to the processing that can be performed by the main camera 401. The main camera 401 and the sub-camera 402 may also exchange the information during live streaming to thereby dynamically change the bit-rate based on the information. For example, the bit-rate of one of the main camera 401 and the sub-camera 402 that is used in the live streaming viewed by a larger number of viewers is increased, and the bit-rate of the other one of the main camera 401 and the sub-camera 402 is decreased. As described above, the digital camera 100 adjusts the bit-rate based on the viewer's rating or popularity, thereby enabling the user to provide the live streaming that is comfortable for the viewers that are viewing the live streaming.

While the present exemplary embodiment illustrates an example in which multi-camera live streaming is performed using two digital cameras 100, i.e., the main camera 401 and the sub-camera 402, the number of the digital cameras 100 to be used in the multi-camera live streaming can be more than two. In this case, as the number of the digital cameras 100 increases, each digital camera 100 increases the amount of change in the bit-rate of the moving image data to be transmitted to the external server. For example, in a setting for transmitting moving image data at a bit-rate of 10 Mbps, the digital cameras 100 transmit moving image data at a bit-rate of 5 Mbps in a case where two digital cameras 100 are used to perform multi-camera live streaming. The digital cameras 100 transmit moving image data at a bit-rate of about 3.3 Mbps in a case where three digital cameras 100 are used.

In the present exemplary embodiment, the functions of the main camera 401 and the sub-camera 402 are set among the digital cameras 100. These functions are included in, for example, information required for live streaming. The digital camera 100 serving as the main camera 401 may transmit, in S611, an instruction indicating the bit-rate of the sub-camera 402 to the digital camera 100 serving as the sub-camera 402. For example, the digital camera 100 serving as the main camera 401 instructs the digital camera 100 serving as the sub-camera 402 to transmit moving image data at a bit-rate of 3 Mbps to the external server 404. This function is for setting to distinguish the digital cameras 100 from each other, and is not necessarily used to determine the priority order or the like of the digital cameras 100.

<Flowchart of Multi-Camera Live Streaming>

FIG. 7 is a flowchart illustrating an example of a processing procedure for the digital camera 100. This processing is implemented in such a manner that software recorded on the non-volatile memory 103 is loaded into the work memory 104 and the control unit 101 executes the software. In the present exemplary embodiment, the main camera 401 and the sub-camera 402 perform the same operation as that performed by the digital cameras 100. The processing in this flowchart starts when the user selects the live streaming function as illustrated in FIG. 5A.

In S701, the control unit 101 transmits a request packet for acquiring information for live distribution (e.g., events) to the server 404. In response to the request packet, the server 404 transmits all recorded information for live distribution (e.g., events) to the digital camera 100. S701 corresponds to each of S602 and S606 illustrated in FIG. 6.

In S702, the control unit 101 receives all the information for live distribution (e.g., events) transmitted from the server 404. S702 corresponds to each of S603 and S607 illustrated in FIG. 6.

In S703, the control unit 101 displays a list of settings for live distribution (e.g., events) received from the server 404 on the display unit 106. The control unit 101 displays on the display unit 106, for example, a list of titles included in the events as illustrated in FIG. 5B. S703 corresponds to each of S604 and S608 illustrated in FIG. 6.

In S704, the control unit 101 determines whether the event of multi-camera live streaming is selected by the operation unit 105. If the control unit 101 determines that an event other than the multi-camera live streaming is selected (NO in S704), the processing proceeds to S708. If the control unit 101 determines that the live streaming event of multi-camera live streaming is selected (YES in S704), the processing proceeds to S705. S704 corresponds to each of S609 and S611 illustrated in FIG. 6.

In S705, the control unit 101 transmits a notification by broadcasting to a device connected within the LAN to indicate that multi-camera live streaming is to be performed. The control unit 101 transmits the notification to another digital camera 100 that performs the multi-camera live streaming within the same LAN in conformity with, for example, a communication protocol called a simple service discovery protocol (SSDP). This notification includes a live streaming identifier. S705 corresponds to each of S610, S612, and S613 illustrated in FIG. 6.

In S706, the control unit 101 determines whether another digital camera 100 has transmitted the notification indicating that the same multi-camera live streaming is performed is within the same LAN. For example, the control unit 101 receives a notification including a live streaming identifier from the other digital camera 100. The control unit 101 compares the live streaming identifier of the event selected in S704 with the received live streaming identifier, and the control unit 101 determines whether the live streaming identifiers match. If the two identifiers match, the control unit 101 determines that another camera 100 that performs the same live streaming is within the same LAN. If the control unit 101 determines that the digital camera 100 that has transmitted the notification indicating that the same multi-camera live streaming is performed is not within the same LAN (NO in S706), the processing proceeds to S708. If the control unit 101 determines that the digital camera 100 that has transmitted the notification indicating that the same multi-camera live streaming is performed is within the same LAN (YES in S706), the processing proceeds to S707. When the control unit 101 determines that the digital camera 100 that has transmitted the notification indicating that the same multi-camera live streaming is performed is within the same LAN, the control unit 101 also calculates, in S706, the number of the digital cameras 100. In addition, the control unit 101 displays a warning sign 505 indicating that the bit-rate of the display unit 106 is to be decreased.

In S707, the control unit 101 performs processing for changing the bit-rate of the moving image to be transmitted to the server 404. For example, the control unit 101 sets, as the bit-rate, the value obtained by dividing the set value of the bit-rate by the total number of the digital cameras 100, which has been acquired in S706, that perform the multi-camera live streaming. As a consequence of S707, even in a case where a plurality of digital cameras 100 that perform the same multi-camera live streaming is within the same LAN, the packet data amount of moving images to be transmitted by the digital cameras 100 is less likely to exceed the network bandwidth, and thus the occurrence of congestion can be reduced. S707 corresponds to each of S614 and S615 illustrated in FIG. 6.

In S708, the control unit 101 determines whether an operation to start the live streaming is performed in the operation unit 105. If the control unit 101 determines that the operation to start the live streaming is not performed (NO in S708), the processing proceeds to S709. If the control unit 101 determines that the operation to start the live streaming is performed (YES in S708), the processing proceeds to S710 to start the live streaming. S708 corresponds to each of S616 and S618 illustrated in FIG. 6.

In S709, the control unit 101 determines whether the event indicates multi-camera live streaming. If the control unit 101 determines that the event does not indicate multi-camera live streaming (NO in S709), the processing returns to S708 to repeat the processing of S708 and wait for an instruction from the user. If the control unit 101 determines that the event indicates multi-camera live streaming (YES in S709), the processing returns to S705 to determine whether another digital camera 100 that performs the same multi-camera live streaming is within the same LAN.

In S710, the control unit 101 sequentially transmits the moving image data sequentially captured by the image capturing unit 102 to the server 404, and performs live streaming. At this time, the server 404 distributes the moving image to viewers. S710 corresponds to each of S617 and S619 illustrated in FIG. 6. The control unit 101 then receives, from the server 404, information about the number of viewers that are viewing the moving image transmitted from the digital camera 100 during the live streaming, and updates the display of the display unit 106 based on the information.

In S711, the control unit 101 determines whether an operation for terminating the live streaming is performed by the operation unit 105. If the control unit 101 determines that the operation for terminating the live streaming is not performed (NO in S711), the processing returns to S710 to continue the live streaming. If the control unit 101 determines that the operation for terminating the live streaming is performed (YES in S711), the processing proceeds to S712. S711 corresponds to each of S620 and S622 illustrated in FIG. 6.

In S712, the control unit 101 transmits a request packet to terminate the live streaming to the server 404, and the live streaming is terminated. S712 corresponds to each of S621 and S623 illustrated in FIG. 6.

These are the descriptions about the operation of each digital camera 100 in the multi-camera live streaming according to the present exemplary embodiment.

While the present exemplary embodiment describes a case where the events are recorded in the server 404, the digital camera 100 may record the events therein. Further, the events can be created by either one of the server 404 or the digital camera 100. If the digital camera 100 records or creates events, there is no need for the digital camera 100 to acquire events from the server 404.

Furthermore, the present exemplary embodiment describes a method in which the digital camera 100 repeatedly transmits the notification to another camera (e.g., S610 illustrated in FIG. 6) during a period from when the event of multi-camera live streaming is selected until the live streaming is started. However, the method of transmitting the notification is not limited to the method. For example, the main camera 401 continuously transmits the notification and calculates the total number of the digital cameras 100 that perform the multi-camera live streaming, based on the number of received responses. Accordingly, the main camera 401 may transmit the calculated numbers in a notification subsequently transmitted.

In the present exemplary embodiment, when the plurality of digital cameras 100 perform multi-camera live streaming within the same LAN, the bit-rate of a moving image to be transmitted by each digital camera 100 is decreased, which leads to a reduction in the occurrence of congestion. Further, since the occurrence of congestion is reduced, each digital camera 100 is less likely to retransmit moving images and is less likely to wait for the transmission. Consequently, even when a plurality of digital cameras 100 performs multi-camera live streaming within the same LAN, a delay time in live streaming of moving images can be minimized.

Some embodiments are implemented in such a manner that a program for implementing one or more functions of the exemplary embodiments described above is supplied to a system or apparatus via a network or a recording medium, and one or more processors in a computer of the system or apparatus read out the program and execute the program. Some embodiments can also be implemented by a circuit (e.g., an application specific integrated circuit (ASIC)) for implementing one or more functions of the exemplary embodiments described above.

While exemplary embodiments have been described, the exemplary embodiments are not intended to limit the scope of the claims. The components according to the exemplary embodiments can be modified and embodied in various ways without departing from the scope of the claims. Further, various embodiments can be formed by appropriately combining a plurality of components disclosed in the exemplary embodiments described above. For example, some components may be deleted from all the components described in the exemplary embodiments. Furthermore, the components in different exemplary embodiments may be combined as appropriate.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-184796, which was filed on Sep. 28, 2018 and which is hereby incorporated by reference herein in its entirety.

What is claimed is:

1. A communication apparatus that is located within a local area network, the communication apparatus comprising:
a communication unit configured to communicate with an external apparatus located outside the local area network and with another communication apparatus located within the local area network;
and a control unit,
wherein the control unit receives information about multi-camera live streaming performed by transmitting moving image data to the external apparatus from the communication apparatus and transmitting other moving image data to the external apparatus from the other communication apparatus, from the external apparatus via the communication unit,
wherein the control unit detects the other communication apparatus configured to perform the multi-camera live streaming via the communication unit based on the information received from the external apparatus, the other communication apparatus being located within the local area network,
wherein the control unit sets a bit-rate of the moving image data used for the multi-camera live streaming to a first bit-rate, in a case where the other communication apparatus configured to perform the multi-camera live streaming is not detected within the local area network,
wherein the control unit sets the bit-rate of the moving image data used for the multi-camera live streaming to a second bit-rate, in a case where the other communication apparatus configured to perform the multi-camera live streaming is detected within the local area network, the second bit-rate being lower than the first bit-rate, and
wherein the control unit controls the communication unit to transmit the moving image data at the set bit-rate to the external apparatus, in a case where the multi-camera live streaming is started.

2. The communication apparatus according to claim 1, wherein the control unit sets the bit-rate of the moving image data used for the multi-camera live streaming before the multi-camera live streaming is started.

3. The communication apparatus according to claim 1, wherein the control unit changes the second bit-rate depending on the total number of communication apparatuses configured to perform the multi-camera live streaming, the communication apparatuses being located within the local area network.

4. The communication apparatus according to claim 1, wherein the control unit decreases the second bit-rate as the total number of communication apparatuses configured to perform the multi-camera live streaming increases, the communication apparatuses being located within the local area network.

5. The communication apparatus according to claim 1, wherein the second bit-rate is a value obtained by dividing the first bit-rate by the total number of communication apparatuses configured to perform the multi-camera live streaming, the communication apparatuses being located within the local area network.

6. The communication apparatus according to claim 1, wherein the control unit compares an identifier for multi-camera live streaming included in the information with an identifier for multi-camera live streaming performed by the other communication apparatus, the identifier for multi-camera live streaming performed by the other communication apparatus being received from the other communication apparatus located within the local area network via the communication unit, and
wherein the control unit detects that the other communication apparatus performs the same multi-camera live streaming as the multi-camera live streaming performed by the communication apparatus, the identifier for multi-camera live streaming performed by the other communication apparatus being received from the other communication apparatus located within the local area network via the communication unit, in a case where the identifier for multi-camera live streaming included in the information matches the identifier for multi-camera live streaming performed by the other communication apparatus.

7. The communication apparatus according to claim 1, wherein the control unit determines a function of the communication apparatus in the multi-camera live streaming based on the information about the multi-camera live streaming, and
wherein the control unit changes the bit-rate of the moving image data to the second bit-rate depending on the function.

8. The communication apparatus according to claim 7, wherein the second bit-rate set in a case where the function is a main camera on a screen for viewing the multi-camera live streaming is higher than the second bit-rate set in a case where the function is a sub-camera.

9. The communication apparatus according to claim 7, wherein the control unit acquires a bit-rate for the other communication apparatus configured to perform the multi-camera live streaming via the communication unit, the other communication apparatus being located within the local area network, and
wherein the control unit changes the bit-rate of the moving image data to the second bit-rate based on the function and the bit-rate for the other communication apparatus acquired via the communication unit, the other communication apparatus being located within the local area network and configured to perform the multi-camera live streaming.

10. The communication apparatus according to claim 1, wherein the control unit instructs, via the communication unit, the other communication apparatus configured to perform the multi-camera live streaming at a predetermined rate, the other communication apparatus being located within the local area network.

11. The communication apparatus according to claim 1, further comprising an image capturing unit,
wherein the control unit sequentially transmits moving image data sequentially captured by the image capturing unit to the external apparatus via the communication unit in a case where the multi-camera live streaming is started.

12. The communication apparatus according to claim 1, wherein the control unit changes the second bit-rate based on information about a viewer that views the multi-camera live streaming in a state where the multi-camera live streaming is executed, the information having been received from the external apparatus via the communication unit.

13. The communication apparatus according to claim 12, wherein the control unit sets the bit-rate for the communication apparatus to be higher than the bit-rate for the other communication apparatus configured to perform the multi-camera live streaming, in a case where a viewer's rating or popularity included in the information about the viewer that views the multi-camera live streaming is higher than the viewer's rating or popularity for the other communication apparatus configured to perform the multi-camera live streaming, and
wherein the control unit sets the bit-rate for the communication apparatus to be lower than the bit-rate for the other communication apparatus configured to perform the multi-camera live streaming, in a case where the viewer's rating or popularity included in the information about the viewer that views the multi-camera live streaming is lower than the viewer's rating or popularity for the other communication apparatus.

14. The communication apparatus according to claim 12, wherein the information about the viewer that views the multi-camera live streaming is at least one of the number of users that have bookmarked the multi-camera live streaming, the number of comments, and the number of high ratings or low ratings.

15. The communication apparatus according to claim 1, wherein the communication unit conforms to an Institute of Electrical and Electronics Engineers 802.11 standard.

16. A control method for a communication apparatus that includes a communication unit configured to communicate with an external apparatus located outside a local area network and with another communication apparatus located within the local area network, the control method comprising:
receiving information about multi-camera live streaming performed by transmitting moving image data to the external apparatus from the communication apparatus and transmitting other moving image data to the external apparatus from the other communication apparatus, from the external apparatus via the communication unit;
detecting the other communication apparatus configured to perform the multi-camera live streaming via the communication unit based on the information received from the external apparatus, the other communication apparatus being located within the local area network;
setting a bit-rate of moving image data used for the multi-camera live streaming to a first bit-rate in a case where the other communication apparatus configured to perform the multi-camera live streaming is not detected within the local area network;
setting the bit-rate of the moving image data used for the multi-camera live streaming to a second bit-rate in a case where the other communication apparatus configured to perform the multi-camera live streaming is detected within the local area network, the second bit-rate being lower than the first bit-rate; and
controlling the communication unit to transmit the moving image data at the set bit-rate to the external apparatus, in a case where the multi-camera live streaming is started.

17. A non-transitory computer-readable storage medium storing a program for causing a communication apparatus including a communication unit configured to communicate with an external apparatus located outside a local area network and with another communication apparatus located within the local area network to execute a control method, the control method comprising:
receiving information about multi-camera live streaming performed transmitting moving image data to the external apparatus from the communication apparatus and transmitting other moving image data to the external apparatus from the other communication apparatus, from the external apparatus via the communication unit;
detecting the other communication apparatus configured to perform the multi-camera live streaming via the communication unit based on the information received from the external apparatus, the other communication apparatus being located within the local area network;
setting a bit-rate of moving image data used for the multi-camera live streaming to a first bit-rate in a case where the other communication apparatus configured to perform the multi-camera live streaming is not detected within the local area network;

setting the bit-rate of the moving image data used for the multi-camera live streaming to a second bit-rate in a case where the other communication apparatus configured to perform the multi-camera live streaming is detected within the local area network, the second bit-rate being lower than the first bit-rate; and controlling the communication unit to transmit the moving image data at the set bit-rate to the external apparatus, in a case where the multi-camera live streaming is started.

* * * * *